United States Patent [19]

George, Jr.

[11] Patent Number: 5,241,817

[45] Date of Patent: Sep. 7, 1993

[54] SCREW ENGINE WITH REGENERATIVE BRAKING

[76] Inventor: Leslie C. George, Jr., P.O. Box 15743, New Orleans, La. 70175

[21] Appl. No.: 784,873

[22] Filed: Oct. 30, 1991

Related U.S. Application Data

[63] Continuation-in-part of Ser. No. 682,306, Apr. 9, 1991, Pat. No. 5,121,607.

[51] Int. Cl.$^5$ ................................. F02C 6/00
[52] U.S. Cl. .................................. 60/39.182
[58] Field of Search ...................... 60/39.182

[56] References Cited

U.S. PATENT DOCUMENTS

| | | | |
|---|---|---|---|
| 3,331,202 | 7/1967 | Brunner | 60/39.182 |
| 3,796,045 | 3/1974 | Foster-Pegg | 60/39.182 |
| 4,027,483 | 6/1977 | Wahl | 60/682 |

OTHER PUBLICATIONS

ZF ECOMAT Brochure F 1/12 SL 854007e, (undated), Zahnradfabrik Friedrichshafen AG, West Germany.
ZF ECOMAT Brochure F 43090/RT 3245-685e, (undated), Zahnradfabrik Friedrichshafen AG. West Germany.
Diesel Particulate Filters: An Update., Automotive Engineering Jul. 1983 p. 304.
A Primer on Heavy-Duty Diesel Particulate Control, Automotive Engineering, Nov. 1984, p. 63+.
Positive-Displacement Supercharging Raises Diesel Efficiency Automotive Engineering, Nov. 1984, p. 42+.
Ceramic Components: Key to Improved Diesel Efficiency?. Automotive Engineering, May 1985, p. 44+.
Advances in Ceramics Spur Adiabatic Engine Development, Mechanical Engineering, Jul. 1985, p. 64+.
Turbocharger vs. Supercharger, Automotive Engineering Jan. 1987, p. 35+.
An RC-1 Organic Rankine Bottoming Cycle for an Adiabatic Diesel Engine, DOE/NASA/0302-1 Dec. 1983.
Steam Bottoming Cycle for an Adiabatic Diesel Engine, DOE/NASA/0300-1 Mar. 1984.

*Primary Examiner*—Stephen F. Husar
*Attorney, Agent, or Firm*—Laubscher & Laubscher

[57] ABSTRACT

A screw engine for propelling a wheeled vehicle via a continuously variable transmission is characterized by a ceramic screw compressor and a ceramic screw expander mounted on a common shaft of the continuously variable transmission. The compressor compresses air and delivers it to a combustion chamber. The air is mixed with fuel in the chamber and ignited to produce combustion products. The combustion products are expanded by the expander to produce a work output for driving the continuously variable transmission and an exhaust output. A heat exchanger is connected with the expander to recover heat from the exhaust output.

7 Claims, 7 Drawing Sheets

SCREW ENGINE WITH REGENERATIVE BRAKING

This application is a continuation-in-part of U.S. patent application Ser. No. 07/682,306 filed Apr. 9, 1991, now U.S. Pat. No. 5,121,607.

BACKGROUND OF THE INVENTION

The present invention relates to an improved system for the recovery of heat energy from the exhaust of internal combustion engines operating on the Otto, Diesel, or Brayton Cycles. More particularly, the engines are of the screw design, employing a Rankine cycle and utilizing fluid, i.e. steam, from this cycle in a regenerative braking and start-up cycle.

BRIEF DESCRIPTION OF THE PRIOR ART

Rankine cycles utilizing water and/or other fluids have been proposed and utilized to recover heat from the exhaust. These systems have not been efficient enough to justify commercialization for vehicle propulsion. Regenerative braking systems, which retard a vehicle and store the braking energy for restart, are known. However, because they are costly and heavy, the use of such systems is justified only in city buses which stop and start frequently. Such systems in long distance buses or commercial trucks would not be justified because of the additional weight, which would reduce the payload capacity.

Currently, adiabatic or low heat rejection engines (LHRE) are being developed in which ceramic materials are used to insulate the internal parts adjacent to the combustion area. The actual gain in fuel efficiency is only 3-4%. The objective appears to be to make the engine lighter, simpler and cheaper by reducing the size of the cooling system or eliminating it altogether. In an efficient conventional Diesel engine, the conversion of fuel energy is generally as follows: 38-40% is converted to mechanical power, 25% is rejected to the engine's cooling and lubricating fluids, and 35% is lost as thermal energy in the exhaust. The LHRE design, with its reduction of heat loss to the cooling system, could result in an exhaust heat content of 42%, and this percentage would increase the nearer the design approached the non-cooled state, so that if cooling were eliminated, the exhaust energy content would approach 55-57%. In the Brayton cycle of a gas turbine engine, the thermal efficiency is less, but there is no cooling of the combustion process so that the energy content of the exhaust gasses is considerable. The same could be said for the internal combustion screw machine which also is not cooled. The combustion process is similar to that of the gas turbine, and the expansion of the gas takes place in a positive displacement machine. Further developments are taking place to utilize this heat lost to the exhaust. For example, cogeneration and combined cycle plants are used in the power industry which combine the Brayton cycle and the Rankine heat recovery cycle for a claimed efficiency of 58%.

For using such cycles on vehicles, an experimental Rankine cycle with a once-through heat exchanger boiler using a synthetic working fluid has demonstrated an improvement of fuel economy of 12% in a conventionally cooled diesel powered truck. Studies show that with the LHRE attaining an exhaust temperature of 1240°-1600° F., an efficiency improvement of 15-35% could be attained using water and steam.

Various retarders have been developed to aid heavy duty vehicles in slowing down during a braking period, thus reducing the need to apply the friction brakes, saving brake maintenance costs, and minimizing down time. The retarders employed include an exhaust brake, an electromagnetic retarder, and a hydrodynamic retarder. These retarders add to the cost, weight and maintenance of the vehicle, and they do not store any of the braking energy.

Regenerative braking systems are also known. These systems function as retarders but are more effective and conserve the braking energy of the vehicle for use when the vehicle accelerates from a stop. Regenerative braking systems typically comprise gyroscopic systems in which the braking energy is transferred to a revolving flywheel, which is coupled to the drive wheels to start or assist in starting the vehicle from a stop, or hydrostatic systems in which the energy of braking is utilized to pump oil from a storage receptacle to a high pressure, i.e. 5000-6000 psia, in a gas filled tank. Once under way, the pressurized gas forces the oil through an oil motor geared to the transmission or drive shaft of the vehicle to start the vehicle or to assist the vehicle in accelerating. These systems add to the cost and weight of the vehicle. While they save on fuel cost and brake overhaul and have environmental benefits, the investment is justified only in city buses which stop and start with great frequency. Furthermore, once the systems have reached their energy storage capacity, they can no longer function in retarding the vehicle.

SUMMARY OF THE INVENTION

According to the invention, there is provided a screw engine for propelling a wheeled vehicle via a continuously variable transmission. The engine includes a ceramic screw compressor mounted on a shaft connected with the continuously variable transmission for compressing air and a combustion chamber connected with the screw compressor and having a fuel input for forming a mixture of fuel and compressed air and igniting the mixture to produce combustion products. A ceramic screw expander is mounted on the shaft of the continuously variable transmission and connected with the combustion chamber for expanding the combustion products to produce a work output for driving the transmission and an exhaust output.

It is another object of the invention to provide a supercharger connected with the screw compressor to supply air thereto, and a heat recovery assembly connected with the screw expander to recover heat from the exhaust output. The heat recovery assembly includes a heat exchanger having first and second coils for direct and recirculating working fluid flows, respectively, affording heat exchange with the exhaust output to generate high pressure vapor.

According to another embodiment of the invention, there is provided an energy recovery system for a wheeled vehicle driven by an internal combustion engine connected through a transmission to a vehicle drive train for transmitting torque to and from the vehicle wheels. The heat in the exhaust gases in the exhaust line from the internal combustion engine is recovered using a Rankine cycle with a working fluid and braking energy is recovered by compressing and expanding the working fluid.

A compressor/expander unit is connected with the vehicle drive train through a lock-up clutch such that when the compressor/expander unit is operated as an expander in a run mode, it assists the engine in driving the vehicle, and when operated as a compressor in a braking mode it stores braking energy. The compressor/expander unit includes a high pressure compressor/expander and a low pressure compressor/expander each having inlet and outlet ports. A heat exchanger including a boiler drum and a flash chamber is connected such that the heat from vehicle exhaust gases is transferred to a working fluid for generating both high-pressure vapor and low-pressure vapor. The boiler drum stores the heated and vaporized liquid and supplies high-pressure vapor to the inlet port of the high pressure compressor/expander during the run mode. The flash chamber supplies low-pressure steam to the inlet port of the low pressure compressor/expander during the braking mode. During the braking mode, the compressor/expander compresses the low-pressure steam into storage tanks from which it is passed to the input of the high pressure compressor/expander during a subsequent run mode.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
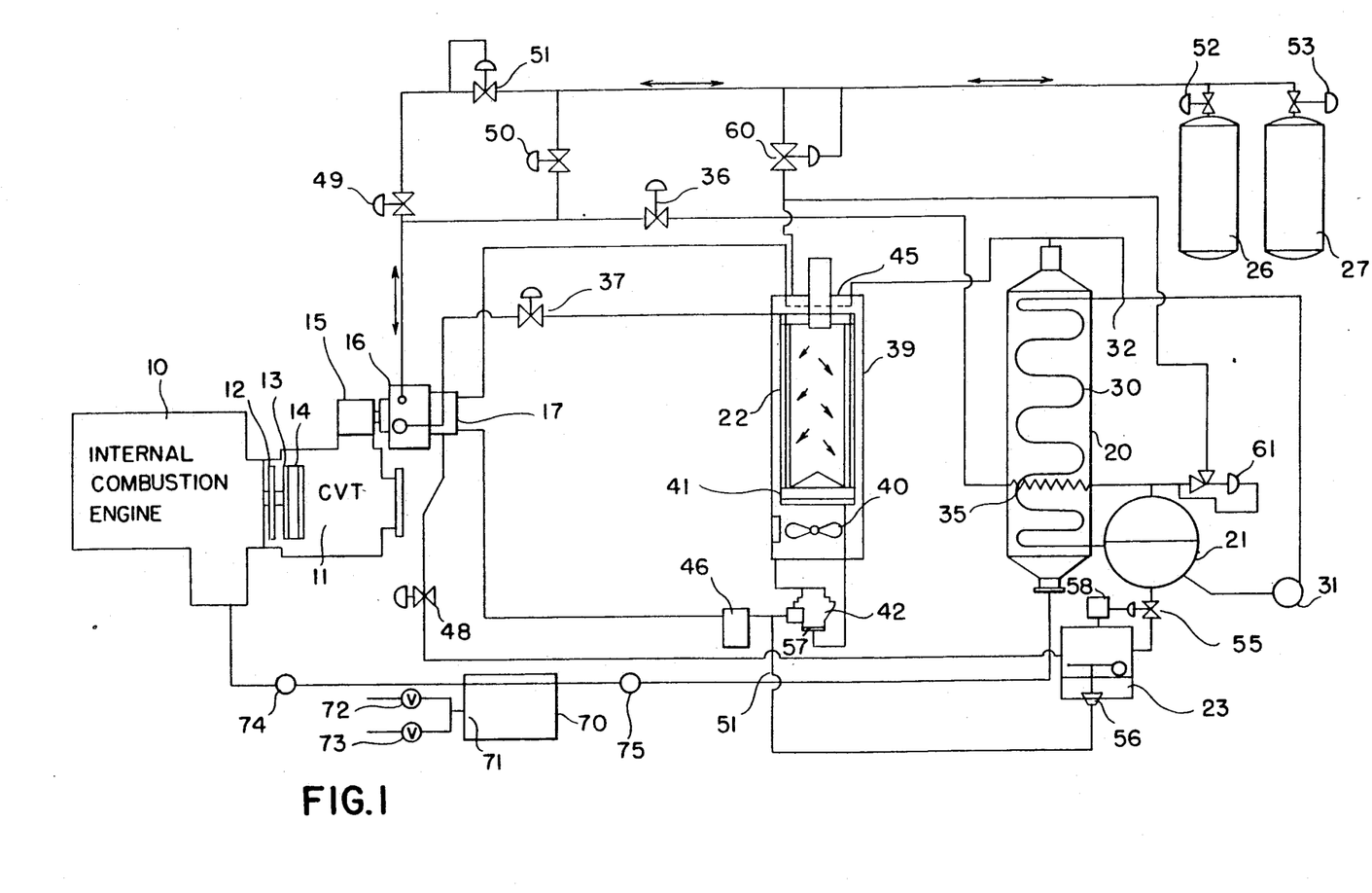
FIG. 1 is a schematic diagram illustrating the energy recovery system according to the invention.

Referring to FIG. 1, an internal combustion engine 10, such as a piston or rotary low heat rejection engine (LHRE) is connected to a continuously variable transmission (CVT) 11 by means of a converter lock-up clutch 12, and a hydrodynamic torque converter 13. The torque converter is utilized when the vehicle is first pulling away in first and second gear. Once the vehicle has pulled away, the converter lock-up clutch 12 bypasses the torque converter 13. A built-in hydrodynamic retarder 14 can be driven by the vehicle in the braking mode. The retarding torque of this retarder would be influenced by its speed determined by the gear ratios of the transmission. A shiftable power takeoff (PTO) 15 on the transmission 11, like the retarder, is vehicle speed dependent. Its speed is determined by the speed of the vehicle and the gear ratio of the transmission. The PTO is shiftable, that is, by means of a clutch it can be disconnected from the transmission, if necessary, isolating the Rankine assist and regenerative braking system from the power train of the vehicle should there be problems with the system components.

A compressor/expander 16 is connected to the PTO 15 of the transmission. By shifting of valves, this compressor/expander is changed between a compressor mode and back to an expander mode as will be explained in detail below. The compressor/expander is preferably a screw compressor although other mechanisms could be used. A boiler feed pump 17 is directly connected to the compressor/expander 16 and turns at the same speed. The feed pump 17 is of variable capacity to vary the output as necessary.

The system comprises a heat exchanger (i.e., boiler) 20, boiler drum 21, and condenser 22 which with the compressor/expander 16 (in the expander mode) comprise the main elements of a Rankine cycle system. The flash chamber 23 and the high-pressure storage tanks 26, 27 along with the compressor/expander 16 comprise the main elements of the brake energy recovery system.

MODES OF OPERATION

There are four modes of system operation. In the run mode, the diesel engine and the Rankine cycle expander both propel the vehicle in a 70-80 to 30-20 ratio. In the braking mode, the engine may be disconnected from the system and the compressor compresses low-pressure steam from the boiler, retarding the vehicle and storing the compressed steam. In the prolonged braking mode, the vehicle continues to brake after the high-pressure storage tanks fill to capacity. The vehicle continues to brake by continuing to compress steam and retard the vehicle, and the compressed steam is bypassed to the condenser. In the start mode, the compressed fluid in the high-pressure tanks is placed in communication with the inlet of the expander to start the vehicle either alone or with the assistance of the internal combustion engine.

In the run mode, the engine 10 provides motive power for the vehicle, together with the expander 16, both through the transmission. The expander is connected to the PTO 15 of the transmission and the engine is connected to the transmission by means of the converter lock-up clutch 12. Exhaust gas from the engine at, say, 1,240°–1,600° F. is directed to and through the boiler or vapor generator 20 to produce steam at 1,000–1,500 psia, exiting at approximately 350° F. It will be seen that this is a recirculating boiler, equipped with a boiler tank or steam drum 21 which acts as an energy storage vessel. The drum 21 supplies steam for the expander 16 and hot fluid to the flash chamber 23. The flash chamber 23 provides low-pressure steam for the compressor 16. The drum 21 also separates the mixture of water and steam which is returned from the heating coils 30 in the exhaust gas passage of the boiler 20.

Tracing the cycle, boiler circulating pump 31 draws hot boiler water at 544°–596° F. from the boiler drum and pumps it through the coils in the exhaust stream and back to the drum. At juncture 32, colder feed water from the condenser 22 is introduced into the stream. The cold feed is heated by admixture with the hot boiler water and at the same time it lowers the temperature of the circulating boiler water so that there will be a greater differential between the temperature of the water in the heating coils 30 and the temperature of the exhaust gasses. The cold feed water enters the heat exchanger mixed with the hot recirculating water so that the mixture will be above the acid dew point of 225° F. The water enters the boiler 20 as liquid, but in passing through coils 30, heat is absorbed from the exhaust gases. Some of the water boils and a mixture of steam and water is led back to the boiler drum 12 where they separate. The steam rises to the top half of the drum, is then led through the superheater coil 35, through stop valve 36 (steam supply), to the expander 16, expands and then exhausts through stop valve 37 at the condenser inlet to the air cooled condenser 22 where it is condensed to liquid.

In the condenser, air is drawn in from outside, at approximately 80° F., drawn over condenser cooling coils 39 by fan 40, and exhausted from condenser at approximately 120° F. In cold weather, this warm air can be directed to the driver's cab of a vehicle, or to the interior of a bus for heating. A pressure of 20 psia with a corresponding temperature of 228° F. is maintained in the condenser and the hot well 41 to exclude air from the system. The condensate falls to the hot well of the condenser which serves as a storage for the condensate. The condensate is picked up by the boost pump 42 and pumped to the feed pump 17 via filter demineralizer 46. The feed pump 17, which is of variable capacity, will pump this condensate through a regenerator 45 (a heat exchanger) where it will pick up the superheat from the expander exhaust. It then enters the boiler circulating water stream at juncture 32 and then the boiler 20, completing the cycle.

BRAKING MODE

When the brake pedal is applied, the system changes to the braking mode. Stop valve 48 (vapor suction from flash chamber) and valve 49 (discharge to storage) open, stop valve 50 (tank return) remains closed, valve 37 (condenser inlet) remains closed, and valve 36 (steam supply) is closed. Regulator valve 51 is partially open and stop valves 52 and 53 on the storage tanks open. The lock-up clutch 12 disengages, and the engine idles. Regulator valve 55 on flash chamber 23 opens. The valves may be solenoid operated under the control of a microcomputer. Microcomputer controls are standard equipment on today's motor vehicles.

The transmission will be driven from the vehicle wheels and the compressor/expander unit 16, now in the compressor mode, will be driven through the shiftable PTO 15 at varying speeds depending upon the amount of retarding required. Flash chamber regulator valve 55 allows hot boiler water from the drum 21 to enter the flash chamber 23. In the low-pressure flash chamber, the heated water will flash into steam. Condensate drops to the bottom of the chamber and is led through a level control valve 56 to the boost pump discharge and on to the feed pump 17 suction. Check valve 57 in boost pump discharge will prevent the higher pressure flash chamber condensate from backing up into the boost pump 42 and the condenser 22. The set pressure in the flash chamber 23 is determined by pressure sensor 58 which controls opening of the regulator valve 55. The compressor/expander now in the compressor mode, takes suction from the flash chamber 23 through stop valve 48. Through stop valve 49, the compressor discharges to the back pressure regulator valve 51 which maintains a set back pressure against the compressor discharge, thereby loading the compressor, and when the maximum or desired pressure is reached, the regulator valve will bypass the excess pressure steam to the storage tanks 26 and 27 in stages through their stop valves 52, 53. The final discharge pressure of the compressor will be determined by the compression ratio, the initial suction pressure from the flash chamber, and the speed of the compressor as determined in the gear ratio of the transmission. As the braking vehicle slows down, the transmission would keep the compressor pumping at maximum capacity. At the beginning of braking, the storage tanks are empty and at low pressure so that there is little resistance to the compressing and little braking. Thus, the back pressure regulator 51 is interposed in the line between the compressor and the tanks, and by maintaining a back pressure against the compressor, provides a braking load on the drive wheels of the vehicle, and this load can be varied by the speed of the compressor. Should this braking at maximum not be sufficient or if there should be heavy demand upon the regenerative braking system, the transmission could be equipped with an optional built-in hydrodynamic retarder 14 which would be activated to assist in the braking. However, it would be employed only when the regenerative system was operating at maximum in order to conserve as much of the braking energy in the storage tanks as possible. Using the engine to brake and the friction brakes would be a last resort.

PROLONGED BRAKING MODE

It has been mentioned that known regenerative braking systems have limits to their retarding and braking. With the hydrostatic systems, once the storage tanks have been filled to capacity, the oil pump can no longer be employed to load the system, and the friction brakes would have to be resorted to, along with using engine braking at a lower gear with consequent wear on the engine. In the described system, in the case of prolonged braking such as down a long mountain grade, when the storage tanks 26, 27 are full at maximum pressure, the pressure actuated bypass regulator valve 60 will function as a dump valve. It will begin to open and relieve this excess pressure through the regenerator 45 to the condenser 22. Bypassing slightly superheated steam (at 1,500 psia, the temperature would be approximately 600° +F.) would load the condenser 22 to a pressure of 50 psia and a temperature of 280° F. This would in turn increase the differential between the ambient temperature and the temperature of the steam in the condenser, so that there would be an increase in rejection of heat to ambient. The condensate would now be 280° F., and the feed leaving the feed pump would be slightly above that, perhaps going to the regenerator at 285° F. In the regenerator it would be heated by the 600° F. steam being dumped from the high-pressure storage system so that it enters the boiler at above boiler temperature at 550° F. With continued braking, the boiler is heated and builds up a pressure beyond set operating maximum, in which case the pressure actuated relief valve 61 would open leading this excess pressure to the condenser. During this extended downhill braking, the engine could be stopped entirely, relying upon the system to retard the vehicle, and, if necessary, utilizing the built-in hydrodynamic retarder 14. The vehicle would arrive at the bottom of the grade with full storage tanks. If the vehicle stopped, the stored pressure would be utilized to start and accelerate the vehicle. If the vehicle continued on route, the stored pressure could be used up in propelling the vehicle with the engine cutting in when the pressure has been reduced and the tanks closed off.

STARTING MODE AND RUNNING

When stopping of the vehicle has been completed, the system may be placed in RUN mode. The engine is idling or stopped, and the lock-up clutch 12 disengaged. Valve 48 (vapor suction from flash chamber) is closed.

Valve 49 (discharge to storage tanks) is closed. Regulator valve 51 is closed (no pressure is being pumped against it). Regulator dump valve 60 is closed. Valve 36 (steam supply) is closed. Valve 37 (condenser inlet) is now open, valve 50 supplying the expander with steam pressure from tanks 26 and 27, and valves 52 and 53 are opened. The compressor/expander unit is now in the expander mode. The degree of admission is increased during starting creating considerable torque and moving the vehicle through the low ratio gearing of the CVT to the higher ratio gears. The vehicle could start on steam power only, using the stored steam. As the storage tanks become depleted, the diesel could be started by engaging the lock-up clutch and assist in accelerating the vehicle. Once the engine is producing power, the hot exhaust gas would be going through the boiler again. When the storage tanks 26 and 27 are depleted to a set amount, valves 52 and 53 are closed. Valve 50 (tank return) closes, no longer feeding steam to the expander, and boiler stop valve 36 (steam supply) opens.

SUPERCHARGING

One of the greatest causes of the formation of particulates in a diesel engine, particularly during starting and accelerating, is the relationship of quantity of combustion air to the fuel being injected into the engine. Most medium and heavy-duty vehicle diesel engines are turbocharged. The energy in the exhaust gases of the engine is used to drive a turbine driven compressor which pumps air to the intake manifold of the engine, supplying more air so that more fuel can be burned in a given sized engine thus producing more horsepower. One of the major problems of the turbocharged diesel engine is that during starting or sudden acceleration, there is a puff or plume of black smoke from the exhaust. With a turbocharged engine, when additional fuel is injected into the engine, there is not enough air on hand to properly burn the additional quantity of fuel injected. The fuel will have to be burned and the exhaust gases led to the turbocompressor where the inertial resistance of the unit will have to be overcome as well as line resistance in the air manifold ducting which will increase if intercooling is used. This delay in getting the additional air to the combustion process is known as "performance lag" or "turbo-lag" and takes from two to four seconds. At this time, the engine is slow in its response, particularly if running at low speed. This can be compensated for in part by designing the turbocompressor for greater output at low speeds, so that at higher speeds it has over capacity so that its output will have to be vented or "wastegated" or the exhaust bypassed around it. Turbocharging has been favored because it does not cost anything in fuel consumption since it is being run on exhaust gas energy which would have been wasted anyway. However, such systems are not all gain because interposing a turbine in the exhaust stream produces a back pressure against the engine which represents a pumping loss to the engine. If a second turbine is interposed, as in turbocompounding, there is again an increase in back pressure and engine pumping losses. Turbocharger output will have to be increased to overcome this back pressure. It has been found that in utilizing a mechanically driven positive displacement supercharger 200 (FIGS. 7 and 9) of screw, root, vane, or other type directly connected to and being driven by the engine by means of V-belts 203, chain belts or gears that the response time or lag is 0.4 seconds as compared to the 2.0 or more seconds of the turbocharger, and the engine is more responsive to the demand for additional power. However, it will be seen that there is still a lag during which particulates and unburned hydrocarbons will be expelled with the exhaust. It will be seen that when the additional fuel is injected into the engine, the fuel will have to be burned to increase the engine speed so that the supercharger speed and output will be increased in order to supply the additional air to burn the fuel. According to the preferred system of FIG. 7 discussed in greater detail below, speed and output of the supercharger is varied by a V-belt or chain belt drive utilizing variable diameter sheaves or pulleys. Such an arrangement can have a speed ratio range of over 6:1 so that the speed and output of the supercharger could be varied independent of the engine speed. On starting, for example, the microcomputer control (FIG. 9) adjusts the sheaves via adjustment device 80 for increased charger output meanwhile delaying the injection of the fuel until there is a more adequate air supply, then fine adjusting to the combustion demand. Thereafter, with any increase in power demand, the control unit will sense movement of the accelerator and will increase air supply in relation to the increased fuel injected and in relation to the combustion process which will be determined by pressure and temperature sensing points, exhaust gas and engine RPM sensor as will be discussed below in connection with FIG. 9.

A supercharger being of positive displacement will not have to run at the high RPM of the turbocharger and will eliminate one of the problems of a turbocharger pertaining to the lubrication of bearings in proximity of the hot engine exhaust. With mechanically driven superchargers, it will produce an additional power increase of 10% with a reduced brake specific fuel consumption. However, studies indicate that utilizing the exhaust in a Rankine cycle as covered by this invention could increase horsepower by 35% and reduce BSFC by 25%.

As stated, there has been a preference for the development of turbocharging since this utilized the otherwise wasted heat energy in the exhaust gases, whereas it was considered that the engine driven supercharger was a load on the engine output. It should be noted, however, that eliminating the turbocharger reduces the back pressure against the engine and reduces the engine pumping losses, particularly if a Rankine cycle is used rather than an expander in the exhaust line. It might be noted too that with a Rankine cycle there is no need to interpose an intercooler between the supercharger discharge and the engine intake manifold. The intercooler would remove heat from the charge air which would otherwise be recovered in the boiler.

A particulate trap oxidizer 70 is provided within the boiler casing. The oxidizer is provided with a burner 71 with connected fuel and air valves 72, 73. Pressure sensor 74 is placed before the trap. The burner keeps the boiler hot for quick starting and to prevent freezing.

SCREW TYPE COMPRESSOR EXPANDER

Figure 2:
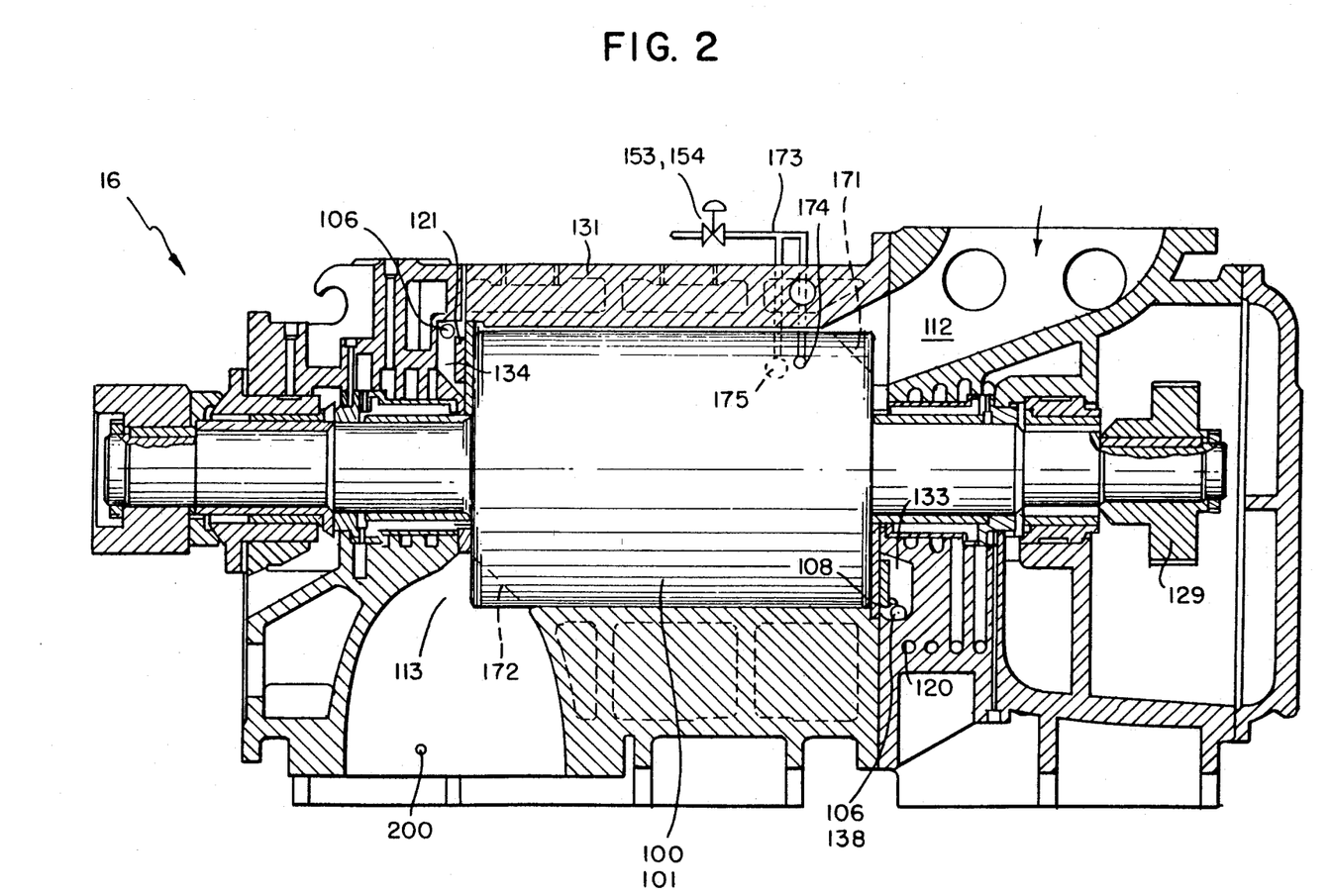
FIG. 2 is an axial sectional view of a screw compressor for use with the invention of FIG. 1.
Figure 3:
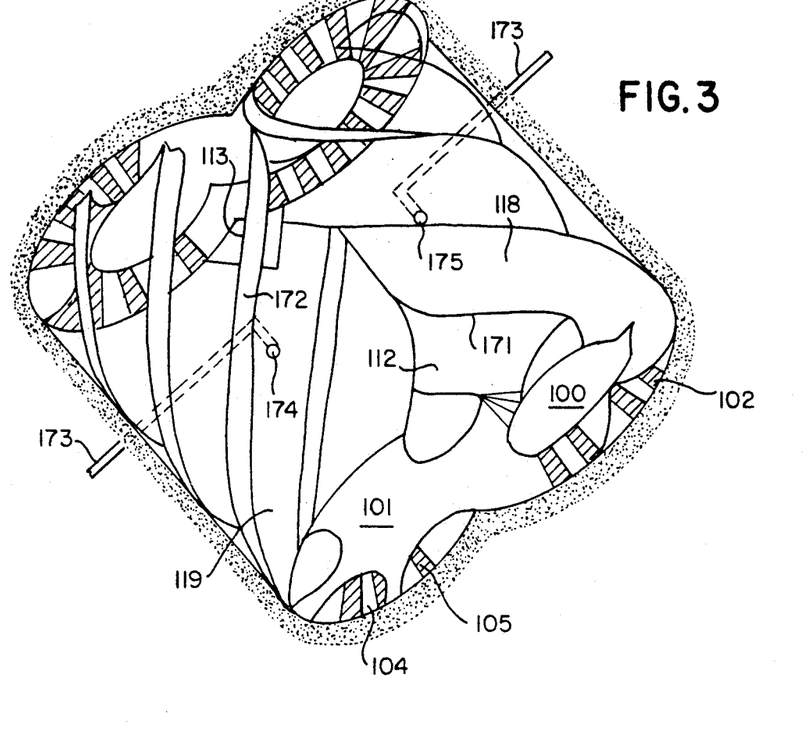
FIG. 3 is a perspective interior view of a portion of the compressor of FIG. 2.

Preferably, the compressor/expander comprises a screw compressor shown in FIGS. 2-6 which can also function as an expander without changing the direction of flow of the compressed or expanded fluid or the rotational direction of the rotors. Referring first to FIGS. 2 and 3, in a screw compressor with two screw rotors 100, 101, the male and female lobes 118, 119 are intermeshed. The interlobal spaces function as compression chambers as the rotors rotate. As a compressor, the fluid enters the unit through a nozzle 112 and suction chamber 133 at the inlet end. As the rotors rotate, the chamber increases in size to maximum volume drawing in fluid from the suction end, and as they continue to rotate, the meshing lobes decrease the chamber volume compressing the fluid against the outlet end plate 121 until the outlet or discharge nozzle or port 113 is reached and the pressurized fluid is discharged. The degree of compression is determined by the size or the outlet port, which is a V-type construction with control ledges 172 at the same angle as the lobes. When the lobes reach and cross the ledges, the compressed fluid is discharged.

The intermeshed rotors are mounted in a casing 131 with end plates 120, 121 at either end. There is no contact between the rotors and the casing or end plates or each other. The rotors are held in position by timing gears 129 mounted in the end housing.

Screw compressors have been used as expanders simply by changing the direction of rotation of the rotors and reversing the direction of flow of the fluid through the unit. Since the direction of rotation of the drive train of a wheeled vehicle is the same when braking or accelerating, this is not desirable. On braking of the vehicle, the screw compressor as disclosed herein operating as an expander will immediately change to the compressor mode to brake the vehicle, utilizing the inertia to compress and store fluid; and when the vehicle accelerates, it will immediately change to expander again, without the need of changing direction of rotation or direction of flow of the fluid.

Figure 4:
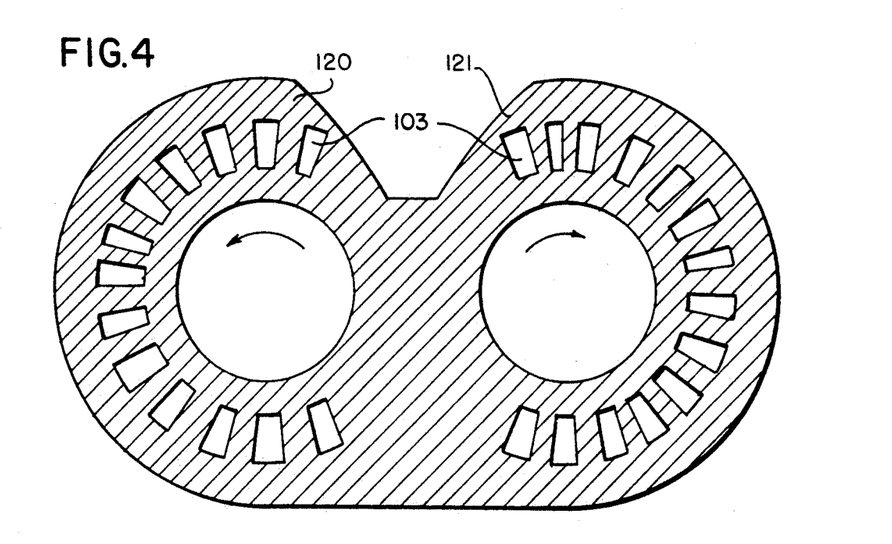
FIG. 4 is a sectional view of an end plate of the compressor of FIG. 2.
Figure 5:
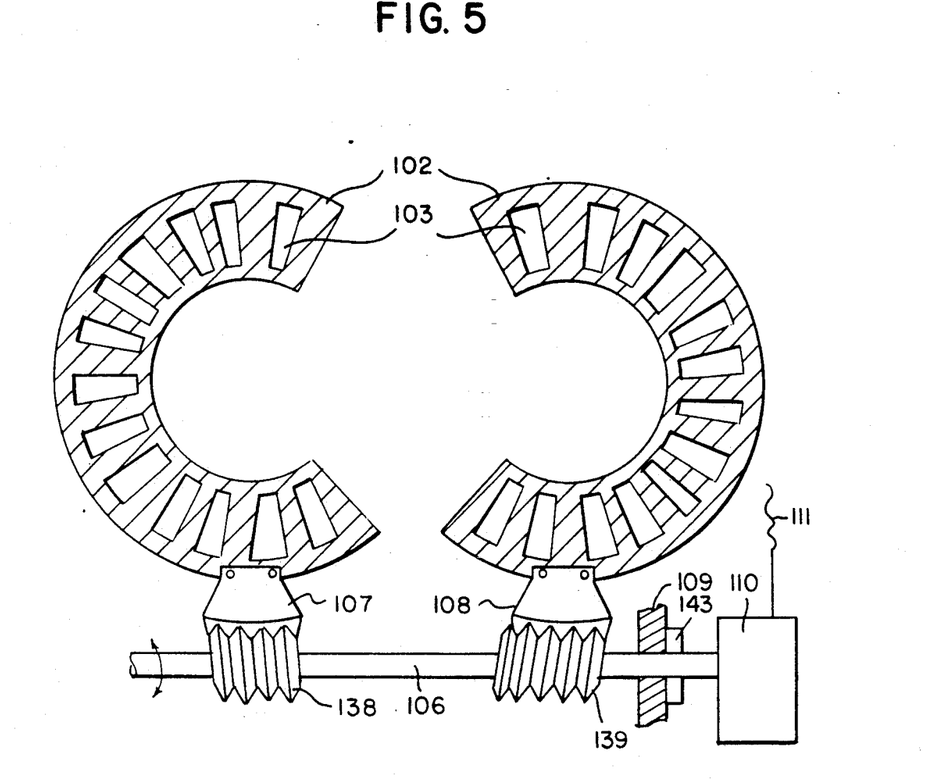
FIG. 5 is a sectional view of a rotor disk valve of the compressor of FIG. 2.

Referring to FIGS. 4 and 5, the invention provides a means by which, at the inlet end of the screw compressor, the large area required for compressor service can be reduced to a small inlet port for expander service by means of installing a ceramic end plate 120 with ports or slots 103 which can be closed off by a rotating ceramic disk valve 102 in the expander mode, forcing the fluid to enter the unit through the main nozzle or port 112. At the outlet end of the unit, the end plate 121, which is closed off by a rotating ceramic disk valve 105 in the compressor mode so that the fluid is continually compressed until the rotor lobes reach the outlet control ledges, has ports or slots 104 cut into it so that in the expander mode more area is provided for the discharge of the expanded fluid. By means of these ports and valves, the unit can be changed from compressor mode to expander mode by simply closing and opening these valves, without changing the direction of rotation of the rotors or the direction of the flow of the fluid, which in either mode is from inlet to outlet end.

According to this invention, the rotors and shafts as well as the casing are constructed of ceramic materials, such as partially stabilized zirconia (PSZ) or silicon nitride, although in the interest of economy, a casing of conventional material employing a ceramic liner could be used. These materials are harder and stronger than steel as well as being lighter, have a lower coefficient of expansion as well as resistance to thermal deformation, and would allow closer radial and axial clearances, eliminating the necessity for oil cooling and sealing. Further, radial bearings of ceramic self-lubricating material or ceramic roller bearings could be employed.

The screw compressor can be used for compressing steam which results in significant superheating due to the thermodynamic features of the steam as well as any interstage leakage. However, screw compressors are relatively insensitive to liquid incursions, so that liberal water injection can be utilized for desuperheating the steam as well as sealing. The desuperheating must be such as not to reduce the efficiency. A temperature sensor 199 is provided in the discharge line of the screw compressor which will send a signal to a microprocessor control unit, which in turn will control the amount of water injected from a feed pump through nozzles 174, 175 by the degree of opening of an injector valve 153, 154. The water could be injected via a line 173 through the suction of the compressor, but if used as a steam expander there is the possibility that excess water would run down and accumulate in the suction chamber. The water is injected through the casing into the compression-expansion space after the lobes 118, 119 have passed the inlet port ledges 171. The compressed fluid will desuperheat but still retain some superheat for storage. On expanding, there will be superheat in the stored fluid and there will be superheating due to leakage and fluid friction in the expansion stages. Hence, it is desired to desuperheat in the lower stage of the expansion so that the exhaust will be brought to near to or below the saturation point so that condensation in the condenser will be more rapid with less heat loss to the cooling medium.

In a dual purpose unit, the end plates cover and close off chambers 133, 134 in the end housings. The opening and closing of the valve makes possible the inlet and outlet of the fluid through these chambers. These chambers or spaces are located at each end of the screw compressor and might be referred to as left hand and right hand chambers, following the rotation arc of the rotors, extending on each side from the inlet control ledges 171 at the top inlet end and to about 40 degrees past bottom dead center, and from the outlet control ledges 172 at the bottom to about 40 degrees past top dead center. As shown in FIG. 5, valves have an extension with gear teeth 107, 108 which mesh with right and left hand screws 138, 139 mounted on a control shaft 106 which extends externally from the housing 109. The control shaft is rotated by a solenoid or servo motor 110 on a signal from the microprocessor control unit via line 111 opening and closing the ports for the desired mode of operation.

Figure 6:
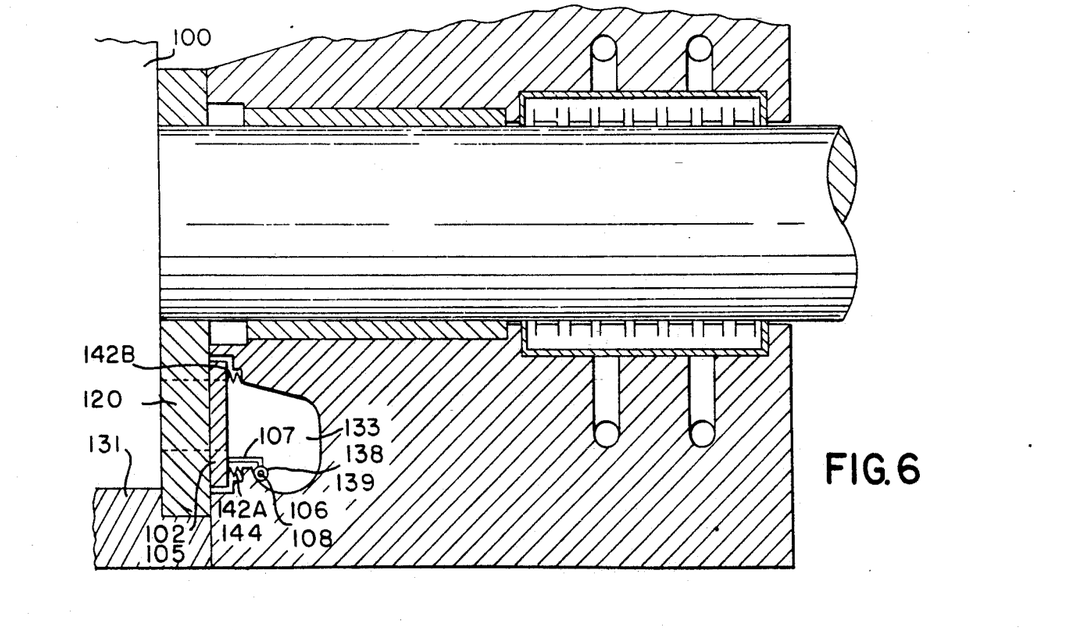
FIG. 6 is a detailed sectional view of a portion of the compressor of FIG. 2 illustrating the mounting of the rotor disk valve.

Referring now to FIG. 6, the valves fit in recesses 144 in the end housings which hold the end plates against the housing. The recesses serve as guides for the rotating valves. The valves are held against their seat on the end plate by corrugated springs 142A, 142B which follow the contour of the disk valves 102, 105. Spring tension should be such that the valves will be firmly seated, but it will be noted that at all times when closed, fluid pressure in the inlet or outlet chambers will be equal to or higher than the fluid pressure within the compression or expansion chambers, so that the disk valves will not be lifted from their seats by internal pressure. When changing from expander to compressor mode, there will be a low pressure in the discharge chamber and line, so that pressure in the compressor chambers will momentarily exceed that in the chamber, tending to lift the valves from their seats against the valve plate. Here, the close fit of the valves in the recess holds them seated against the plate until pressure in the chamber is built up to exceed that in the compressor chambers. The width of the slots 103, 104 shall not be greater than the width of the rotor lobes 118, 119, so that the slot when closed is fully covered as the lobe passes over it, preventing blowby of the fluid through the slot from a higher pressure chamber to an adjacent chamber of lower pressure.

Except for inlet nozzle 112 and outlet nozzle 113, the housing is closed off at inlet and outlet ends by end plates (FIG. 4) which are duplicates. At the inlet end, the plate is notched at the top for nozzle 112 and at the outlet end the notch is at the bottom for nozzle 113. Normally, as a compressor, the screw compressor has a chamber or cavity which circles down from an inlet area to give the compressor maximum suction area. At the outlet end, the plate would be blank except for the outlet nozzle to ensure compression until the outlet control ledges are reached.

FIG. 5 is a sectional view of the end valve 102 showing slots 103 in valve 102 and end plate 120 for the passage of fluid. These slots can be opened and closed by rotating disk valve 102. These valves cover the slots in the end plates when counter-rotated. The end plates and the disk valves are made of hard ceramic material and may be made in matched sets. At the bottom of the valves are protruding gear teeth 107 and 108 which mesh with right hand and left hand screws 138 and 139 mounted on shaft 106 which extends through housing 109 and packing gland 143 and is connected to solenoid or servomotor 110.

Referring again to FIG. 2, as a compressor, the screw compressor is provided with a suction chamber or cavity to provide a large suction area for the compressor. As previously described, to function as an expander an end plate is provided with slots and valves to close off this chamber from the rotors, so that incoming pressurized fluid is forced to enter the unit through inlet nozzle 112. The formerly blank plate at the outlet end, which provided for the compressing of the fluid, is fitted with valve and slots communicating with exhaust chamber 134 which communicates with outlet nozzle 113 for the exhaust of the expanded fluid. As an expander, the compressed fluid enters the expansion chamber through the nozzle until the lobes pass inlet control ledges 171 which act as "cut-off" and expansion of the fluid begins. As a compressor, the fluid is compressed against the end plate with valves and slots now closed and is exhausted when the lobes reach outlet control ledges 172. As a compressor or expander there will be superheating of the fluid, particularly if steam is used, and the invention provides for the desuperheating of same by means of water injection which also assists in the sealing.

Figure 7:
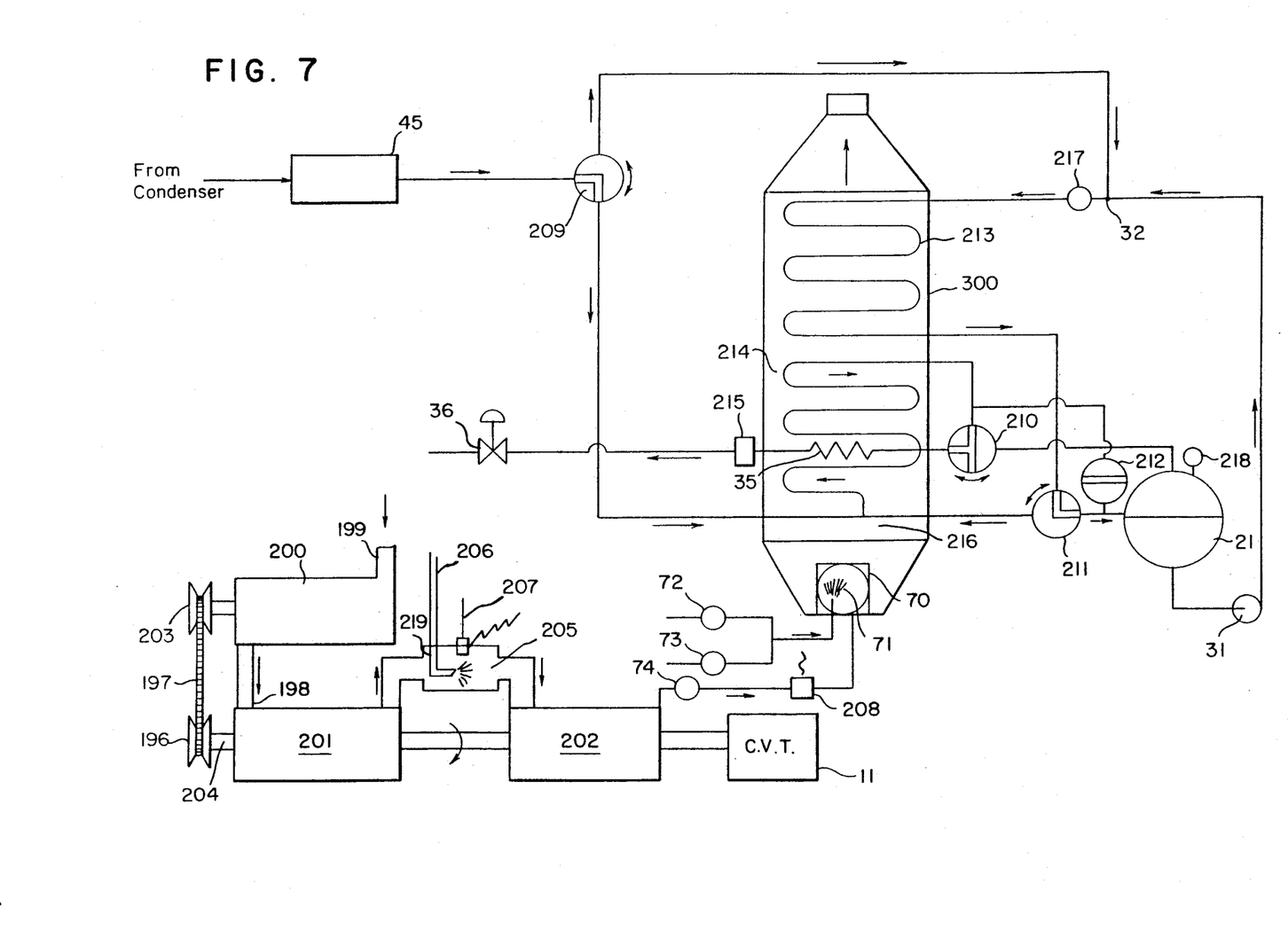
FIG. 7 is a schematic diagram illustrating the screw engine with heat recovery according to the invention.

Referring now to FIG. 7, the internal combustion screw engine according to the invention will be described. The engine includes a screw compressor 201 mounted on the same shaft 204 as a screw expander 202, which shaft is connected to the continuously variable transmission 11. The compressing is two-staged, the compressor being supplied air at a varying volume and pressure from a separately mounted supercharger 200 which is driven from the compressor shaft 204 by V-belt 197 and pulley assembly 196 and 203. These pulleys are variable diameter pulleys. The diameter of the belt-pulley surface can be adjusted while at a high speed of rotation to provide a continuous ratio of the supercharger speed to the compressor speed.

The supercharger 200 draws air through inlet duct 199 and discharges through passage 198 to the inlet port of the compressor, which in turn discharges to combustion chamber 205 wherein fuel in a liquid or gaseous state is supplied through line 206. The fuel is injected into combustion chamber and ignited at the point of injection by igniter 207. Water or steam could be injected into the combustion process by injector 219 to impede formation of nitrous oxide. The hot gasses are expanded in the expander and directed through a trap oxidizer 70 to a boiler, i.e. heat exchanger, 300 where more power is produced by recovery of heat from the exhaust gases.

The expander may be equipped with an expansion ratio modulation system which is known in screw applications. Under low load conditions, there could be an over expansion of the gases which could be a power drag on the unit. By means of a capacity control modulation system, slots in the last stages are opened by a slide valve venting these stages to the exhaust to provide early exhaust at low loads.

In the expander discharge line there is a pressure sensor 74 which will sense back pressure in the line caused by accumulation of particulates and other by-products of combustion on the ceramic filtering element of the trap. This will signal microprocessor control (not shown) to ignite the burner 71 and burn off the accumulations. The trap-oxidizer has its own fuel and air supply through valves 72 and 73, respectively. The burner in the trap could be programmed to keep the heat exchanger warm when the vehicle is parked in cold weather and to prevent damage from freezing and to burn the hydrocarbons continuously, and an oversized burner could be used to produce steam in the boiler to propel the vehicle in an emergency situation.

In the expander discharge line there is a Lambda sensor 208, or other such device, to monitor the exhaust products of the engine and, through microprocessor control of the variable diameter pulleys driving the supercharger, to maintain optimum fuel/air ratio under all conditions.

With the vehicle in operation, the exhaust from the engine is directed to the boiler which begins to warm up. Temperature sensor 215 monitors the temperature of the lower set of generating tubes or coils 214, and when sufficiently hot to generate steam, signals a feed pump (not shown) through microprocessor control to begin pumping water from the condenser (FIG. 1) to the boiler 300 through regenerator 45. At two-way valve 209, the feed is directed to header 216 at the bottom of the boiler. At the opposite side of boiler, the header is blocked off by a two-way valve 211 which is closed. The feed is thus forced up through generating tubes or coils 214, exiting the boiler shell as steam approximately half way up. The feed is directed to three-way valve 210 which directs steam through a superheater 35 for superheating and then through a temperature and pressure sensor to a stop valve 36 which will regulate the steam to the expander.

When the system is activated, circulation pump 31 draws working fluid such as water from the drum 21 and pumps the water past mixing junction 32 and temperature sensor 217 to economizer tubes or coils 213 in the top half of the boiler shell. The tubes are directed downwardly so that circulation in the tubes is counter to the flow of exhaust gas. The heated water and in time, as the water begins to boil, the mixture of water and steam will exit the boiler shell and be directed to the two-way valve 211 which directs the mixture to the boiler drum. The circulating pump will continue to circulate water as the system heats up and pressure is built up in the boiler drum. Pressure sensor 218 on the drum signals the microprocessor which determines when the pressure is sufficient for full operation as a recirculating boiler, and the system will convert. The two-way valve 209 rotates and directs feed to the junction 32 where it is mixed with the recirculating water and directed to the economizer coils through temperature sensor 217. The mixture of water and steam exits the boiler shell and is directed to the two-way valve 211 which has rotated and now directs the mixture to header 216, then up through generating tubes where it is converted to saturated steam.

On exiting the boiler shell, the mixture is directed to the three-way valve 210 which has rotated and is closed off to the mixture. The mixture thus is directed to the now open valve 212 which in turn directs the mixture to the drum where steam and entrained water separate. The saturated steam is led off from the top of the drum to valve 210, which has now rotated and is open to the steam, directing it to and through the superheater 35 past pressure and temperature sensor 215 through control valve 36 to the expander. The boiler will now operate as a recirculating boiler. Drum pressure will be sensed by the pressure sensor 218 and microprocessor control will maintain optimum pressure by controlling the use of the steam through the valve 36. This control could be overridden with a temporary demand for more steam for the expander for more power production.

Figure 8:
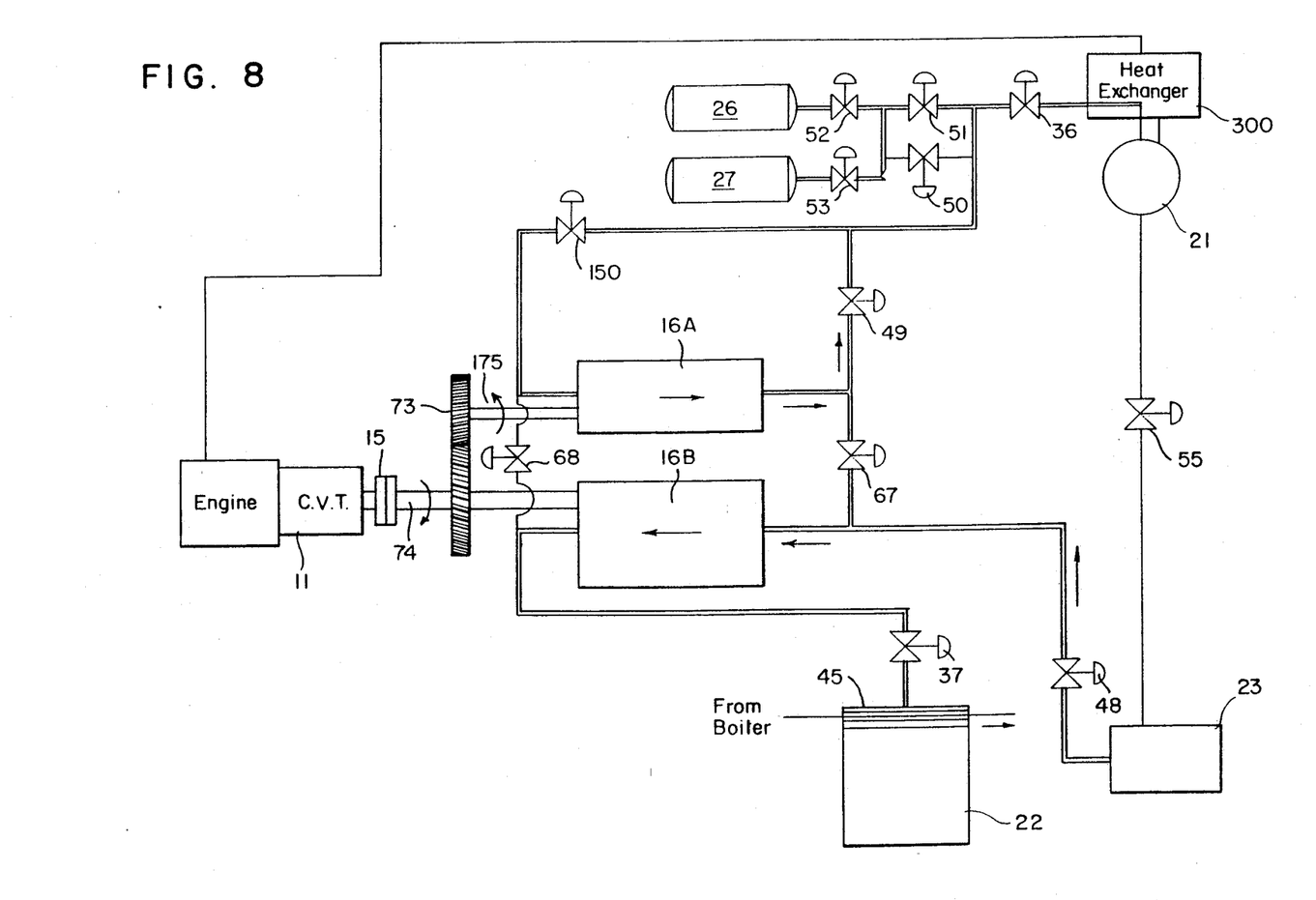
FIG. 8 is a schematic diagram illustrating an alternate embodiment of an energy recovery system.

Referring now to FIG. 8, there is shown a two-stage screw compressor/expander within a motor vehicle which uses a combined regenerative braking cycle and a Rankine bottoming cycle. Of course, any multi-stage screw compressor/expander may be used. All functions are controlled by signals from a conventional microprocessor control unit (not shown). When the vehicle is braked, the system is set in a braking mode, with the screw units in their compressor mode. The units are driven by the inertia of the vehicle through the drive wheels and a continuously variable transmission with a power take-off 15, through drive shaft 74, external timing gears 73 and drive shaft 175. The low pressure compressor 16-B draws from flash chamber 23 through valve 48 and discharges pressurized steam through valve 68 (now open) with valve 67 closed to the inlet port of the high pressure compressor 16A. (Valves 37 and 150 are closed.) The steam is compressed to high pressure and discharged through valve 49 to the back pressure regulator 51 which will maintain a back pressure against the compressor so as to load the braking, and then direct the steam through stop valves 52 and 53 on to storage tanks 26 and 27. During this procedure valve 36 is closed.

When the stopped vehicle starts again, the system is set in a run mode, with the screw units in their expander mode to utilize the stored and pressurized steam in accelerating the vehicle. Steam in storage tanks 26 and 27 is passed selectively through stop valves 52 and 53 and stop valve 50, then through valve 150 to inlet of the high pressure expander 16A (with valve 68 closed). Valve 49 is closed. The steam is expanded and exhausts through valve 67 to the inlet of the low pressure expander 16B (with valve 48 now closed), expanding and exhausting through valve 37 (now open) to the regenerator 45 and condenser 22. When the stored steam pressure falls to a predetermined level, valves 52 and 53 will close, valve 51 will close, valve 150 opens, valve 36 will open and the system will run on steam from the boiler drum 21.

Figure 9:
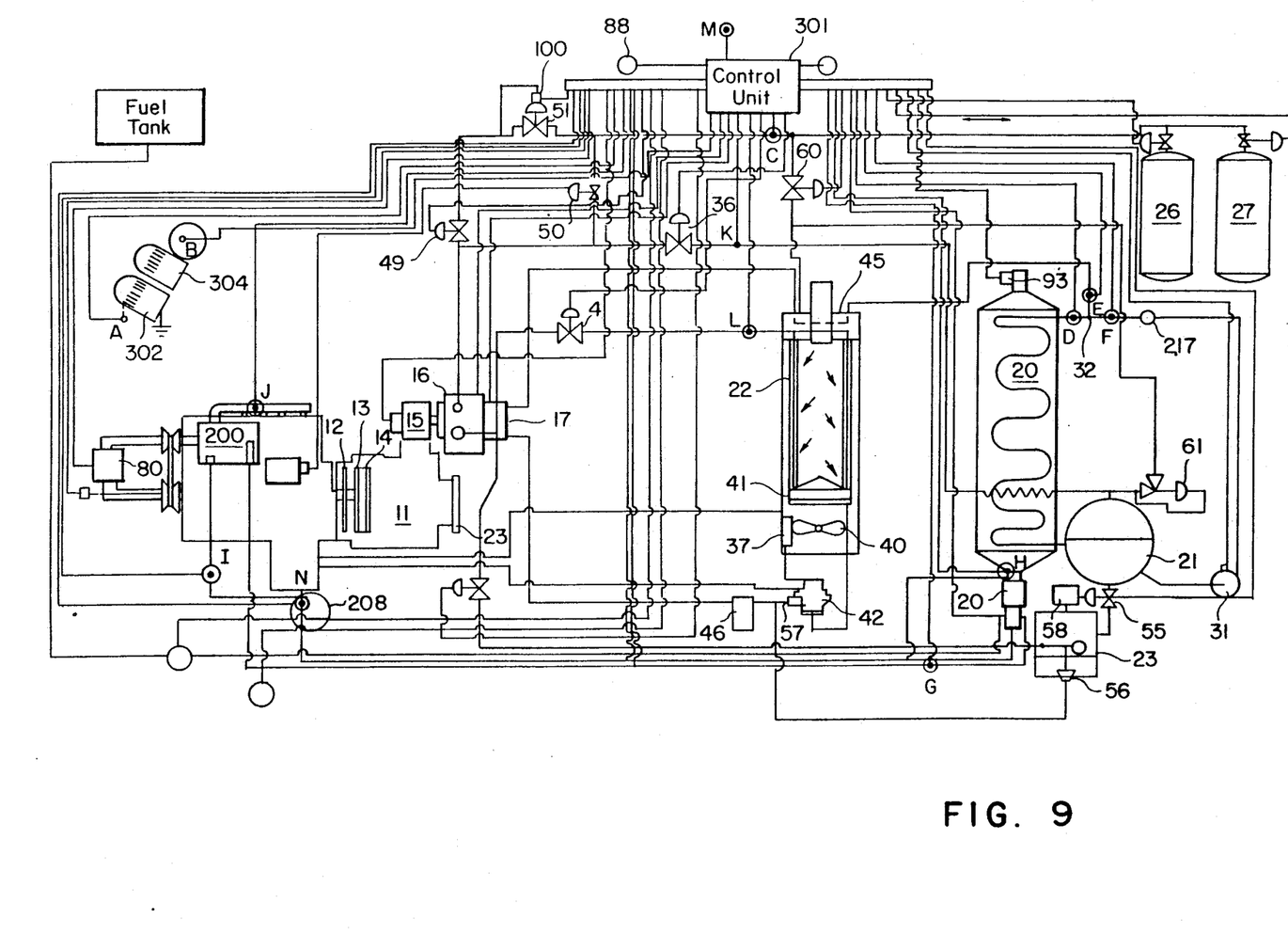
FIG. 9 is a schematic diagram of the control circuit for the energy recovery system.

The control circuit of the energy recovery system will be described in connection with FIG. 9. A microprocessor control unit 301 is connected with various elements of the system and receives signals from a number of sensing points to control the operation thereof. First and second sensing points A, B detect the position of the vehicle accelerator 302 and brake pedal 304, respectively. Fluid pressure in the header of the storage tanks 26, 27 is detected at C. Adjacent the junction 32, the temperature of the mixture of feed and circulating water entering the boiler 22 is detected at D. The temperature of the feed from the regenerator to the boiler is detected at E and the temperature of the boiler circulating water is detected at F. At point G, the pressure of the engine exhaust entering the trap oxidizer is sensed, while the pressure of the engine exhaust exiting the trap oxidizer is detected at H. The pressure and temperature of the supercharger discharge to the engine intake manifold are sensed a points I and J, respectively. Boiler pressure is detected at K and the pressure of the expander exhaust to the condenser is sensed at L. The temperature of the ambient air and altitude is detected at M while the temperature of the engine exhaust in the manifold is sensed at N.

At the junction 32, the sensor 217 senses the temperature of the combined hot circulating water from the boiler and the colder feed water. Through the control unit 301, the speed and output of the circulating pump 31 is regulated to provide an optimum relationship between the quantity of circulating water in relation to the feed water. If there is an excess of feed water, the mixture will enter the boiler or heat exchanger below the dew point of the exhaust gases (i.e. around 240° F.) and there will be a possibility of acid corrosion. If there is an excess of hot circulating water, then the water will enter the heat exchanger at a temperature too high for optimum absorption of heat from the exhaust gases.

The use of screw mechanisms as an internal combustion engine is an important advance in the art. Preferably, the screw mechanisms are a form of ceramic material requiring little or no cooling. Newly developed ceramic materials are heat resistant and retain their strength at high temperatures, and have roughly one-half the thermal expansion of steel, yet are twice as strong as steel. Ceramic sleeve or roller bearings, which require no lubrication and are commercially available, could be placed closer to the rotors, shortening the distance between bearings, further strengthening the support of the rotors. Constructing a unit in this way would allow closer clearances and reduce blow-by and provide the engine with greater flexibility. Using an internal combustion screw engine with an exhaust heat recovery system, any heat in blow-by which would normally be a heat loss would be recovered in the boiler. Internal bearings adjacent to the rotors can also be used with a conventional screw compressor. Since the bearings are self-lubricating, there would be no lubricant to contaminate the fluid being compressed. Shortening the distance between the bearings would strengthen the rotors and reduce deflection.

A further advance in the art provided by the present invention relates to the direct and recirculating flow boiler including first and second coils for the working fluid. In previous installations on vehicles, boilers have been "once-through boilers", that is, they comprise coils installed in the exhaust passage, with no drum. Fluids were pumped directly through the coils, entering as a liquid and emerging as a gas. The invention incorporates a recirculating boiler which would have a drum. Liquid is pumped through the coils and the mixture of liquid and gas emerging from the coils is led to the drum for separation. The introduction of a drum will add weight to the installation, due to the weight of the drum and its liquid contents, but it is justified not only because of additional efficiency but because it would act as a steam supply for the regenerative braking and start-up cycle and provided a reserve of stored power during increased demand which would allow a smaller and lighter internal combustion unit.

A once-through boiler, without the drum and having less liquid content, would warm up sooner on starting the vehicle and sooner provide fluid under pressure, whereas the recirculating boiler would take longer. Therefore the boiler of the invention has the features of both with a drum and two sets of coils. On first starting, the once-through or direct flow coils are put into service, and provide steam to the expander through a superheater. Meanwhile the recirculating pump would pump liquid from the drum through economizer coils located in the top of the boiler casing, counter to the flow of the exhaust gas and back to the drum. Suitable pressure and sensing points are located in the system, feeding the information to a microprocessor control unit. When sufficient pressure is built up in the recirculating system (i.e. drum), solenoid or motor control valves will be actuated connecting the two systems, so that the boiler will function as a recirculating boiler, providing high pressure steam from the drum through the superheater to the expander during the run mode, and low pressure steam from the flash chamber to the compressor during the braking mode.

What is claimed is:

1. A screw engine for propelling a wheeled vehicle via a continuously variable transmission, comprising
   (a) screw compressor means mounted on a shaft connected with the continuously variable transmission for compressing air;
   (b) means defining a combustion chamber connected with said screw compressor means and having a fuel input for forming a mixture of fuel and compressed air from said screw compressor and igniting the mixture to produce combustion products;
   (c) screw expander means mounted on the shaft connected with the continuously variable transmission and connected with said combustion chamber means for expanding the combustion products to produce a work output for driving the continuously variable transmission and an exhaust output;
   (d) a variable supercharger for supplying air at variable rates to said screw compressor means;
   (e) sensor means connected with said screw expander means for sensing the exhaust output; and
   (f) control means connected with said sensor means for controlling said variable supercharger to vary the air supplied to said screw compressor means, whereby the ratio of the fuel and air in said combustion chamber can be controlled independently of engine speed for optimum combustion.

2. A screw engine as defined in claim 1, and further comprising means for driving said supercharger with said screw compressor means.

3. A screw engine as defined in claim 2, wherein said driving means comprise a pair of variable diameter pulleys connected with said screw compressor means and said supercharger, respectively, and a V-belt arranged between said pulleys.

4. A screw engine as defined in claim 1, wherein said screw compressor means and said screw expander means comprise ceramic screw mechanisms.

5. A screw engine as defined in claim 1, and further comprising means connected with said screw expander means for recovering heat from the exhaust output.

6. A screw engine as defined in claim 5, wherein said heat recovering means including a heat exchanger having first coils for direct working fluid flow and second coils for recirculating working fluid flow, said coils affording heat exchange with the exhaust output to generate high-pressure vapor.

7. A screw engine as defined in claim 6, wherein said heat exchanger includes a trap oxidizer for trapping and burning particulates and unburned hydrocarbons from the exhaust output.

* * * * *